June 4, 1963 W. L. STRICKLAND 3,091,965
RADIO FREQUENCY HAZARD DETECTOR

Filed May 27, 1960 2 Sheets-Sheet 1

William L. Strickland,
INVENTOR.

BY S. J. Rotondi
A. P. Dupont
C. A. Phillips
ATTORNEYS.

June 4, 1963   W. L. STRICKLAND   3,091,965
RADIO FREQUENCY HAZARD DETECTOR
Filed May 27, 1960   2 Sheets-Sheet 2

William L. Strickland,
*INVENTOR.*

BY
ATTORNEYS.

3,091,965
RADIO FREQUENCY HAZARD DETECTOR
William L. Strickland, Huntsville, Ala., assignor to the United States of America as represented by the Secretary of the Army
Filed May 27, 1960, Ser. No. 32,488
1 Claim. (Cl. 73—362)
(Granted under Title 35, U.S. Code (1952), sec. 266)

The invention described herein may be manufactured and used by or for the Government for governmental purposes without the payment of royalty thereon.

This invention relates to temperature measuring devices and concerns particularly devices for detecting dangerous ignition conditions in rocket ignitors due to radiation of electric fields.

Rocket ignitors and particularly squibs which contain a resistive element or bridge wire are designed to ignite at a prescribed temperature. At a missile launching site usually a substantial amount of cabling thru which the firing potential is applied is connected to the squib located within the explosive charge of a rocket. Radiation from electronic equipment will produce within the cabling and missile firing circuit in general stray currents which, in combination with ambient heat, may be of such magnitude as to raise the temperature of the squib to that of an explosive condition.

It is an object of this invention to provide a means for detecting the heating effect due to extraneous radiation on an explosive squib.

It is a further object to provide means of the above nature which will be of light weight and completely portable.

It is a further object to provide means of the above nature which will be positive and reliable.

It is a further object to provide a means of the above nature which will be operatable by non-technical personnel.

For the attainment of these and such other objects as may appear, I have shown an embodiment of my invention in the accompaning drawings wherein.

In the accompanying drawings all like components and subassemblies are designated by the same numeral.

Figure 1:
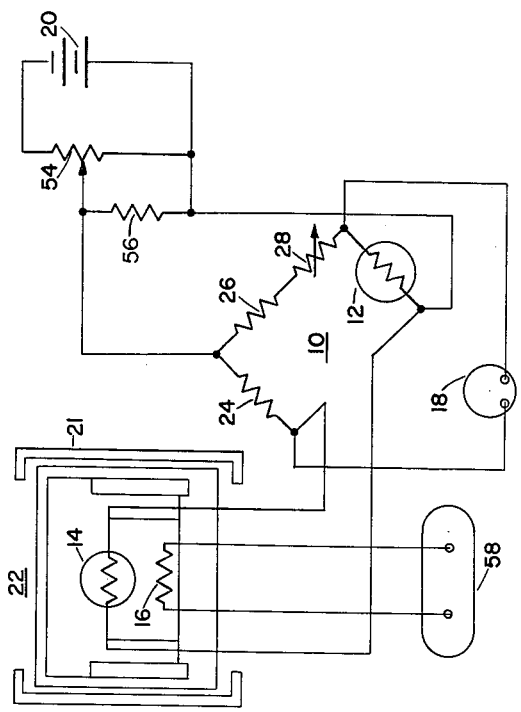
FIGURE 1 is a basic schematic diagram showing an embodiment of the invention.

The embodiment of the invention illustrated in FIGURE 1 comprises in general: A bridge network 10, which includes in two of its electrically adjacent legs two thermistors 12 and 14 for sensing temperature; a bridge wire 16 the temperature use of which is to be measured and which is thermally linked to thermistor 14; a sensing device 18; and a voltage source 20.

Thermistor 12 being thermally coupled to and influenced by the ambient temperature is in an adjacent leg to thermistor 14. Electrically adjacent to thermistor 14 and opposite to thermistor 12 within the bridge network is resistor 24. The remaining leg of the bridge consists of a fixed resistance 26 and a variable resistance 28. The function of the variable resistance 28 is to bring the bridge into a balanced condition when there is no difference in the temperatures influencing thermistors 12 and 14. Source 20 is supplied to the bridge through a voltage divider potentiometer 54 in parallel with a resistance 56. The voltage is supplied to the bridge by a connection to a first terminal between thermistors 12 and 14 and a second terminal between resistors 24 and 26. The remaining terminals of the bridge are connected across sensing device 18. Bridge wire 16, which is located in housing 21 of squib 22, is connected to receptacle 58 to which the missile firing cabling is connected when a measurement is desired. If and when any stray currents are picked up by the missile firing cabling from any source and at any frequency they will pass through and influence by heating the bridge wire 16 as would be the case within the actual squip of a missile at a firing site. Squib 22 is made identical to a firing squib except that the explosive charge has been removed. Heating of a bridge wire is the action which detonates a squib, and since bridge wire 16 is thermally coupled to thermistor 14 a change in its temperature will influence the balance of bridge 10. An unbalanced bridge 10 will give an indication on the sensing device 18 which is calibrated to a scale convenient to the purpose.

Figure 2:
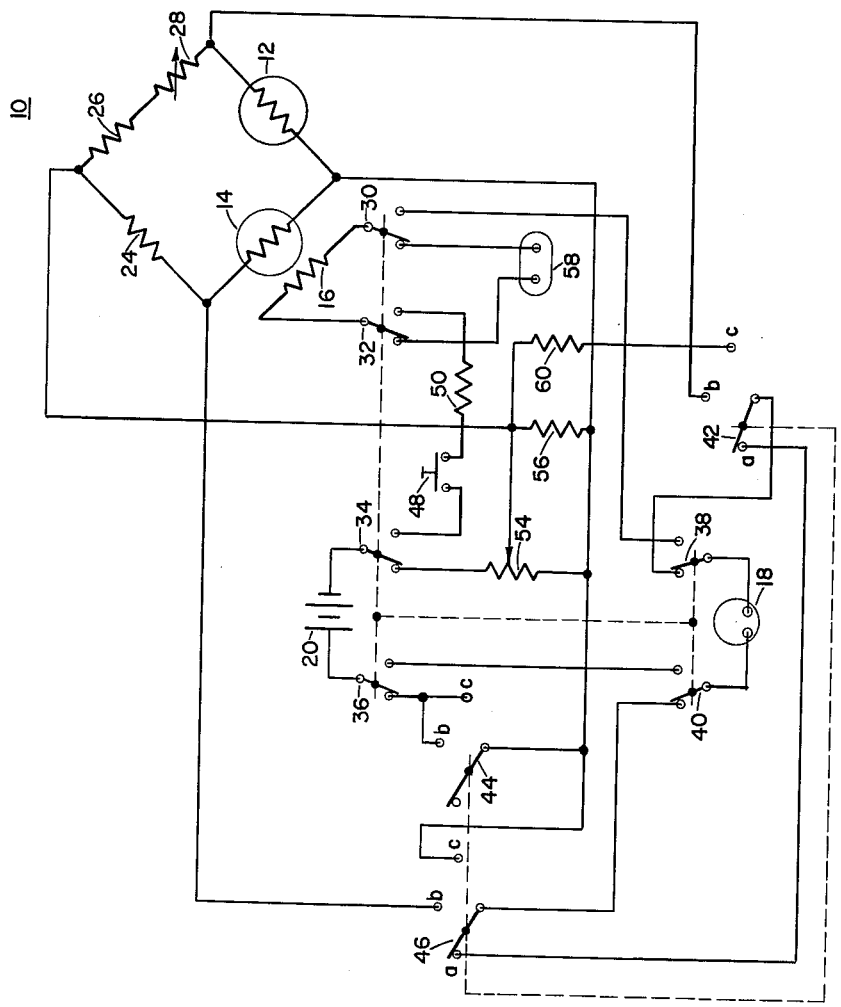
FIGURE 2 is a schematic circuit diagram of an embodiment of the invention including certain test features.

FIGURE 2 illustrates an embodiment of the basic invention together with featured means for rapidly testing and calibrating the circuit. As shown in this diagram switches 30, 32, 34, 36, 38 and 40 being mechanically linked through their throw arms are single pole double throw devices each having one left and one right position or throw with corresponding terminals. Switches 42, 44 and 46 being mechanically linked through their throw arms are single pole three throw devices, each having switch positions a, b and c and corresponding terminals. When the throw arms of switches 30, 32, 34, 36, 38 and 40 are in the left position, the a position of switches 42, 44 and 46 is the off position for the detector. When the throw arms of switches 30, 32, 34, 36, 38 and 40 are in the left position and the throw arms of switches 42, 44 and 46 are in the b position, the circuit is the same as that which is illustrated in FIGURE 1.

Figure 3:
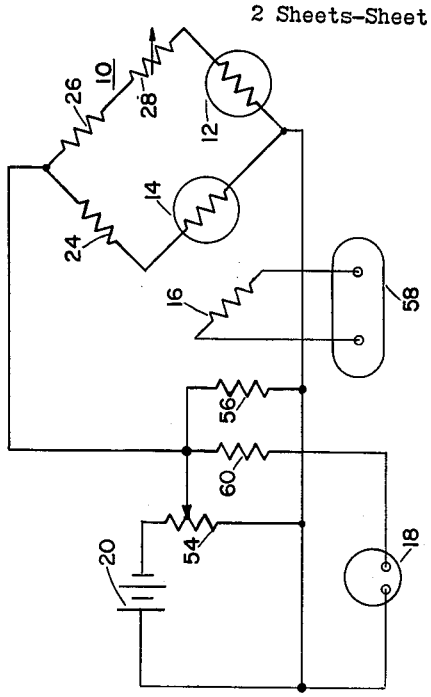
FIGURES 3 and 4 are schematic circuit diagrams showing embodiments of the test circuits of the invention.

When the throw arms of switches 42, 44 and 46 of FIGURE 2 are in the c position and the throw arms of switches 30—40 are in the left position the resulting circuit would appear as that of FIGURE 3. This circuit arrangement places the sensing device 18 in series with resistance 60, and connects one side to source 20 and the other side to the movable contact of potentiometer 54 to one side of resistance 56, and to the terminal of bridge 10 which is between resistors 24 and 26. One terminal of potentiometer 54 connects to source 20 and the other terminal to the other side of source 20, the other terminal of resistance 56 and the connection on bridge 10 between thermistors 12 and 14. This position of switches 42, 44 and 46 and the resulting circuit is used to compensate for a weakening battery and to adjust the voltage applied to bridge 10 by varying potentiometer 54.

Figure 4:
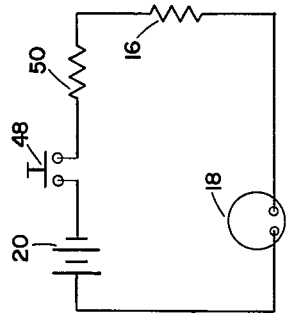

FIGURE 4 illustrates the resulting circuit if the throw arms of switches 30, 32, 34, 36, 38 and 40 of FIGURE 2 are in the right position.

In this right position of the switch throw arms the circuit is a series combination of source 20, sensing device 18, resistance 50, bridge wire 16, and push button switch 48. This test circuit is used for checking the continuity of bridge wire 16.

The principles of the invention explained in connection with a specific exemplification thereon will suggest many other applications and modifications of the same. It is accordingly desired that, in construing the breadth of the appended claim, they shall not be limited to the specific details shown and described in connection with exemplifications thereof.

I claim:

A rocket ignitor dangerous condition detector comprising: an electrical bridge comprising, a fixed resistance, a variable resistance and first and second thermistors, a first terminal of said fixed resistance attached to a first terminal of said variable resistance, a second terminal of said variable resistance attached to a first terminal of said first thermistor, a second terminal of said first thermistor connected to the first terminal of said second thermistor, the second terminal of said second thermistor being connected to a second terminal of said fixed resistance; a sensing element having two terminals; a power source having two terminals; a deactivated squib comprisin a bridge wire having two terminals and thermally coupled to said second thermistor; a receptacle having two terminals; a first, second and third resistance; a potentiometer having an intermediate contact and two end terminals; a push button switch having two terminals; a three throw switch having first, second and third poles, each comprising a moveable contact and first, second and third fixed contacts; a double throw switch having first thru sixth poles each comprising a moveable contact and two fixed contacts; the moveable contact of said first pole of said three throw switch being connected to a first fixed contact of said first pole of said double throw switch; the moveable contact of said second pole of said three throw switch being connected to said third fixed contact of said first pole of said three throw switch, to a first end terminal of said potentiometer, to a first terminal of said first resistance and to the connection between said thermistors; the moveable contact of said third pole of said three throw switch being connected to said first fixed contact of said second pole of said double throw switch; the moveable contacts of said first and second poles of said double throw switch being connected across said terminals of said sensing device; said moveable contacts of said third and fourth poles of said double throw switch being connected across the terminals of said power source; said moveable contacts of said fifth and sixth poles of said double throw switch being connected across the terminals of said bridge wire; said first fixed contact of said first pole of said three throw switch being connected to the first fixed contact of said third pole of said three throw switch; said second fixed contact of said first pole of said three throw switch being connected to the connection of said fixed resistor and thermistor; said second and third fixed contacts of said second pole of said three throw switch being connected to the first fixed contact of said third pole of said double throw switch; said second fixed contact of said third pole of said three throw switch being connected to the connection of said variable resistor and said thermistor; said third fixed contact of said third pole of said three throw switch being connected thru said second resistance to the second terminal of said first resistance, to said intermediate contact of said potentiometer, and to the connection of said fixed resistor and said variable resistor; said second fixed contact of said first pole of said double throw switch being connected to said second fixed contact of said third pole of said double throw switch; said second fixed contact of said second pole of said double throw switch being connected to said second contact of said sixth pole of said double throw switch; said first fixed contact of said fourth pole of said double throw switch being connected to said second end terminal of said potentiometer; said second fixed contact of said fourth pole of said double throw switch being connected thru said push button switch and said third resistance to said second fixed terminal of said fifth pole of said double throw switch; said first fixed contacts of said fifth and sixth poles of said double throw switch being connected respectively to separate said terminals of said receptacle.

References Cited in the file of this patent

UNITED STATES PATENTS

| | | |
|---|---|---|
| 2,021,491 | Ruben | Nov. 19, 1935 |
| 2,685,203 | McEvoy et al. | Aug. 3, 1954 |
| 2,789,432 | Schmidt | Apr. 23, 1957 |
| 2,805,311 | Fluegal et al. | Sept. 3, 1957 |